Jan. 15, 1924.  F. W. HEWITT  1,480,907
HEATING ELEMENT FOR FLUID-CIRCULATORY SYSTEMS
Filed Dec. 1, 1922
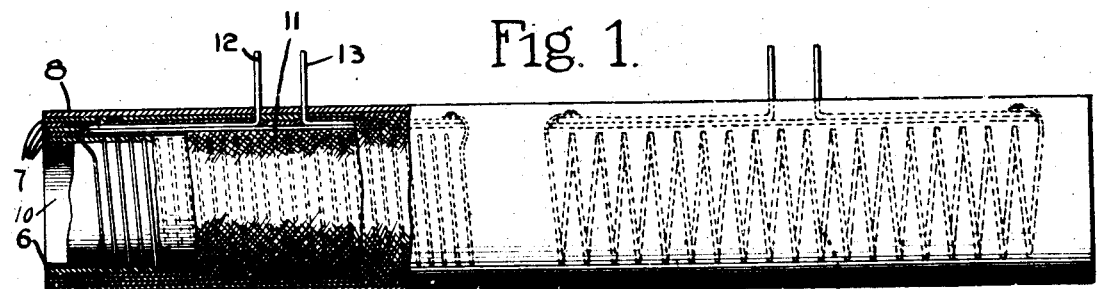
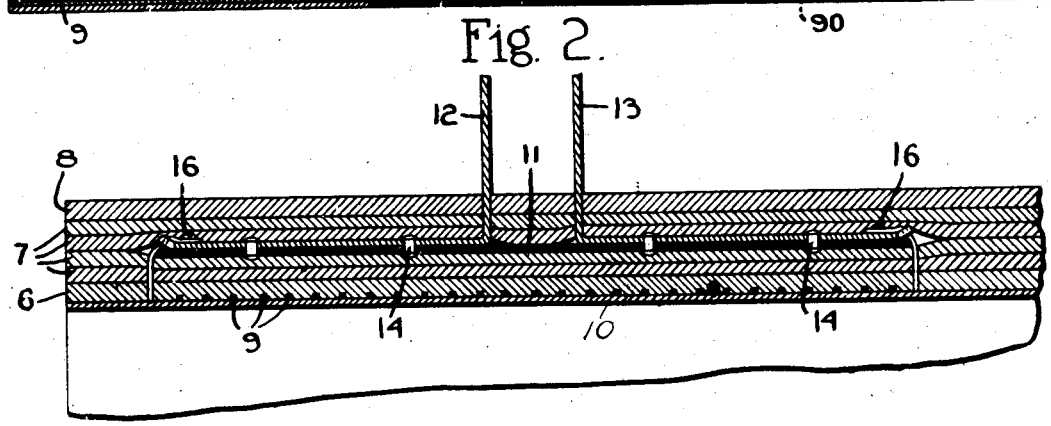
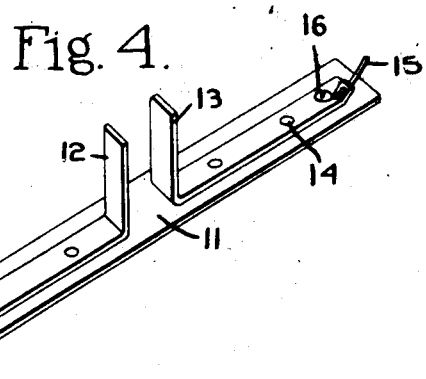
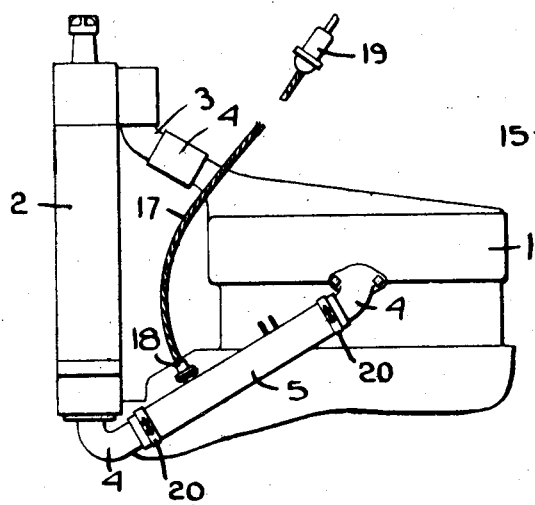
Inventor.
Frank W. Hewitt
by Heard Smith & Tennant
Attys Patented Jan. 15, 1924.

1,480,907

UNITED STATES PATENT OFFICE.

FRANK W. HEWITT, OF ARLINGTON, MASSACHUSETTS, ASSIGNOR TO SIMPLEX ELECTRIC HEATING COMPANY, OF CAMBRIDGE, MASSACHUSETTS, A CORPORATION OF MASSACHUSETTS.

HEATING ELEMENT FOR FLUID CIRCULATORY SYSTEMS.

Application filed December 1, 1922. Serial No. 604,151.

*To all whom it may concern:*

Be it known that I, FRANK W. HEWITT, a citizen of the United States, and resident of Arlington, county of Middlesex, State of Massachusetts, have invented an Improvement in Heating Elements for Fluid Circulatory Systems, of which the following description, in connection with the accompanying drawing, is a specification, like characters on the drawing representing like parts.

This invention has for its object to provide a heating element for a fluid circulatory system and more particularly for use in connection with the jacketing water system of an automobile engine. The main purpose is to provide a simple and efficient device to be used to protect against freezing and enable the automobile readily to be started in cold weather.

The object of the invention is to provide a device of this nature which will not interfere in any way with the ordinary use of the fluid circulatory system, such as the water jacketing system of an automobile engine, and yet which when required will produce the desired heating effect.

The object of the invention is further to provide such a device which may receive its energy from the ordinary electric lamp socket.

These and other objects and features of the invention will appear more fully from the accompanying description and drawings and will be particularly pointed out in the claims.

In the drawings;

Fig. 1 is a side elevation, partially broken away to show constructional details, of a device embodying a preferred form of the invention;

Fig. 2 is an enlarged detail in cross section of a portion of the construction shown in Fig. 1;

Fig. 3 is a side elevation of a portion of an automobile to illustrate one form of circulatory water jacket system and showing the application of a preferred form of this invention thereto;

Fig. 4 is a detail in perspective of the insulation plate and terminals employed in the construction illustrated in the remaining figures.

While the principles of this invention are applicable to any fluid circulatory system in which it is desired to impart heat to the fluid and which will also by reason of the impartation of the heat secure the circulation of the fluid in the system, yet the invention is more particularly designed for use in the water jacketing system of an automobile engine. As is well known it is very difficult to start an automobile engine in extremely cold weather and if the temperature is low enough to freeze the water in the jacketing system serious damage is done to the automobile by the freezing of the water.

This invention provides a heating element adapted to receive its energy from an ordinary electric current by connecting the terminals to an ordinary electric lamp socket. This heating element is in the form of a hose section which is inserted in the circulatory system and contains within its structure an electric resistance coil. A hose section commonly forms a part of the water jacket circulatory system in an automobile engine where the jacket of the engine is connected to the radiator and it is only necessary, therefore, to substitute for the ordinary hose section a hose section embodying the present invention to secure the desired results. When the hose section embodying the present invention is supplied with electric energy the water in the section is heated and this causes the water in the jacketing system to circulate and become heated throughout. This warms the engine and enables it readily to be started in cold weather and also prevents the water from freezing and thus damaging the engine and jacketing system.

In Figure 3 is illustrated in a general way a small portion of an automobile showing a simple and ordinary form of jacketing system. In this construction the water jacket 1 of the engine is connected to the radiator 2 by pipes 3 and 4 and interposed in each pipe are hose sections 4 and 5 respectively. These are ordinarily employed to enable the radiator readily to be disconnected from the jacket of the engine.

The present invention utilizes one of these hose sections, for example that shown at 5 to provide an embodiment of the present invention.

In a preferred form of the invention such as that illustrated the hose section in general is made up as usual. It commonly comprises a plurality of concentric layers of rubber composition and textile material such as fabric or cords all vulcanized together. For example, as shown, there is an inner layer 6 of rubber composition surrounded by several layers 7 of the textile material such as woven fabric and herein shown as four in number. Outside of these layers is an outer surface coating of rubber composition. These concentric layers of rubber composition and textile material may vary in number and relation as desired and by means of the usual interposed cement coatings and the usual process of vulcanization are formed into a comparatively heavy and thick hose section.

In this invention an electric resistance coil 9 of wire is supported at, and preferably embedded in, the interior surface of the hose section. For convenience in the manufacture of the device it is found desirable to provide the hose section with an innermost thin coating 10 of rubber composition which enables the hose section in the process of manufacture readily to be removed from the mandrel upon which it is usually formed. This coating 10 is, however, so thin as not materially to interfere with the transmission of heat from the coil 9 to the fluid in the hose section.

The coil 9 may be of any desired length depending upon the amount of energy to be transmitted. In the construction illustrated two sets of coils are provided in the hose section, the one indicated at 9 and the second at 90. The coil 9 contains, by reason of its greater number of windings, a greater length of wire and will thus with the same current produce a greater amount of heat. This enables one or the other coil to be used according to the amount of heat which it is desired to generate.

Means are provided for connecting the terminals of each coil exteriorly of the hose section to an electric circuit. In the form illustrated the terminals of each coil, for this purpose, protrude exteriorly of the hose section. The construction for this purpose is the same with respect to both coils. An insulating plate 11 of suitable material is interposed between two of the concentric layers of the hose section. A pair of metallic terminals 12 and 13 are supported upon this plate in separated relation rigidly secured to the plate by rivets 14. The ends 15 of the coil resistance wire are secured to the ends of the terminals 12 and 13 in any suitable manner as by the binding screws 16. The opposite or free ends of the terminals 12 and 13 project through the material of the hose section exteriorly thereto. In the manufacture of the hose section these various parts are put in place as the various layers are built up on the mandrel so that the entire resistance coil with its insulation plate and terminals are held firmly and rigidly in position.

The terminals 12 and 13 are adapted to be connected by any suitable connection with an ordinary lamp socket. As shown in Figure 3 an insulated wire connector 17 is provided at one end with a socket 18 which may be connected to the terminals of either coil and at its other end with a plug 19 which may be connected to a lamp socket.

When the device of this invention is used in connection with an automobile it is only necessary to remove the usual hose connection and substitute a hose section of this invention clamping it in place in the pipe 4 in the usual manner by the clamping bands 20. When it is desired to heat the water in the jacketing system the terminals of one or the other coil, according to the amount of heat desired, are connected by the connector 17 to an electric lamp socket. If more heat is desired both coils may be connected to lamp sockets. The heat thus generated by the electric circuit in the coils heats the water inside of the hose section and also sets up a circulation in the entire system thus producing the desired results.

It will thus be seen that the invention presents a very simple and efficient form of device readily substitutable for the hose section of the ordinary water jacketing system of an automobile and which also may be used in any other fluid circulatory system where it is desired to heat the fluid.

Having thus described my invention, what I claim as new and desire to secure by Letters Patent, is:

1. A heating element for a fluid circulatory system comprising a hose section insertable in the system, and an electric resistance coil supported concentrically of the section at its interior surface whereby, when the section is inserted in the system and the coil is interposed in an electric circuit, the fluid in the section will be heated and caused to circulate through the system.

2. A heating element for a fluid circulatory system comprising a hose section insertable in the system, and an electric resistance coil embedded concentrically of the section in its interior surface whereby, when the section is inserted in the system and the coil is interposed in an electric circuit, the fluid in the section will be heated and caused to circulate through the system.

3. A heating element for a fluid circulatory system comprising a hose section insertable in the system, and an electric resistance coil embedded concentrically of the section in its interior surface and having its terminals protruding exteriorly from the section whereby, when the section is inserted in the system and the terminals are interposed in an electric circuit, the fluid in the 4. A heating element for a fluid circulatory system comprising a multi-ply rubber composition and textile material hose section, an electric resistance coil supported concentrically of the section at its interior surface, an insulation plate interposed between the plies of the section, and a pair of terminals secured to and held separated by the plate and connected to the coil and protruding exteriorly of the section whereby, when the section is inserted in the system and the terminals are interposed in an electric circuit, the fluid in the section will be heated and caused to circulate through the system.

5. A heating element for a fluid circulatory system comprising a multi-ply rubber composition and textile material hose section, an electric resistance coil embedded concentrically of the section in its interior surface, an insulation plate interposed between the plies of the section, a pair of terminals secured to and held separated by the plate and connected to the coil and protruding exteriorly of the section whereby, when the section is inserted in the system and the terminals are interposed in an electric circuit, the fluid in the section will be heated and caused to circulate through the system.

In testimony whereof, I have signed my name to this specification.

FRANK W. HEWITT.